US009275780B2

(12) United States Patent
Debray et al.

(10) Patent No.: US 9,275,780 B2
(45) Date of Patent: *Mar. 1, 2016

(54) COIL CAPABLE OF GENERATING AN INTENSE MAGNETIC FIELD AND METHOD FOR MANUFACTURING SAID COIL

(75) Inventors: Francois Debray, Proveyzieux (FR); Jean Dumas, Varces (FR); Rolf Pfister, Voreppe (FR); Christophe Trophime, Saint Martin Le Vinoux (FR); Jean-Marc Tudela, Seyssinet (FR); Nadine Vidal, Hurtieres (FR)

(73) Assignee: CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 599 days.

This patent is subject to a terminal disclaimer.

(21) Appl. No.: 13/641,685

(22) PCT Filed: Apr. 19, 2011

(86) PCT No.: PCT/EP2011/056194

§ 371 (c)(1),
(2), (4) Date: Oct. 16, 2012

(87) PCT Pub. No.: WO2011/131645

PCT Pub. Date: Oct. 27, 2011

(65) Prior Publication Data

US 2013/0038331 A1 Feb. 14, 2013

(30) Foreign Application Priority Data

Apr. 19, 2010 (FR) ..................................... 10 52952

(51) Int. Cl.
*G01V 3/00* (2006.01)
*H01F 6/06* (2006.01)

(Continued)

(52) U.S. Cl.
CPC .................. *H01F 6/06* (2013.01); *H01F 7/202* (2013.01); *H01F 41/04* (2013.01); *H01F 5/02* (2013.01); *H01F 6/04* (2013.01); *Y10T 29/4902* (2015.01)

(58) Field of Classification Search
CPC ........................................................ H01F 6/06
USPC ........................................................ 324/322
See application file for complete search history.

(56) References Cited

U.S. PATENT DOCUMENTS 2,007,484 A 7/1935 Tolerton
2,592,802 A 4/1952 Harrold (Continued)

FOREIGN PATENT DOCUMENTS

EP 0 146 494 A1 6/1985
FR 2 892 524 A1 4/2007

(Continued)

OTHER PUBLICATIONS

A. Bourquard et al., A New Design for the Superconducting Outsert of the GHMFL 42+ T Hybrid Magnet Project, IEEE Transactions on Applied Superconductivity 20, 684 (2010).

(Continued)

*Primary Examiner* — Rodney Fuller
(74) *Attorney, Agent, or Firm* — Blakely Sokoloff Taylor & Zafman LLP

(57) ABSTRACT

A method for manufacturing a coil for generating an intense magnetic field when an electric current passes through it. Turns are formed in a cylindrical tube made of conducting or superconducting material. At least one indentation is formed in an edge of at least one turn. Insulating material is positioned between the turn including the indentation and an adjacent turn. The recess forms with the insulating material a channel between the interior and the exterior of the tube when the coil is stressed.

18 Claims, 3 Drawing Sheets

(51) Int. Cl.

| | |
|---|---|
| ***H01F 7/20*** | (2006.01) |
| ***H01F 41/04*** | (2006.01) |
| *H01F 5/02* | (2006.01) |
| *H01F 6/04* | (2006.01) |

(56) References Cited

U.S. PATENT DOCUMENTS

| | | | | |
|---|---|---|---|---|
| 3,427,710 | A | 2/1969 | Milliams | |
| 3,466,743 | A | 9/1969 | de Puy | |
| 8,307,536 | B2 * | 11/2012 | Debray et al. | 29/602.1 |
| 2009/0206974 | A1 * | 8/2009 | Meinke | 336/224 |

FOREIGN PATENT DOCUMENTS

| | | | |
|---|---|---|---|
| JP | 49-39240 | | 10/1974 |
| JP | 56098804 | | 8/1981 |
| JP | 60257507 | | 12/1985 |
| JP | 1012506 | | 1/1989 |
| JP | 2086105 | | 3/1990 |
| JP | 3083303 | | 4/1991 |
| JP | 3179711 | | 8/1991 |
| JP | 05-41117 | | 6/1993 |
| JP | 7079946 | | 3/1995 |
| JP | 11097270 | | 4/1999 |
| JP | 2007081254 | | 3/2007 |
| WO | WO 2009/053420 | A1 | 4/2009 |

OTHER PUBLICATIONS

A. Bourquard et al., The 42+T Hybrid Magnet Project at CNRS-LNCMI-Grenoble, Journal of Low Temperature Physics 159, 9th International Conference on Research in High Magnetic fields, Jul. 22-25 2009, Dresden, Germany.

L. Latrasse et al., Seism: A 60 GHz cusp electron cyclotron resonance ion source, Review of Scientific Instruments 81 02A324 (2010), 13th International Conference on Ion Sources, Sep. 22-25 2009, Gatlinburg, Tennessee,.

Trophime, C., et al., “Magnetic Calculations at teh Grenoble High Magnetic Field Laboratory,” *IEEE Transactions on Applied Superconductivity*, vol. 12, No. 1, Mar. 2002, pp. 1483-1487.

* cited by examiner

COIL CAPABLE OF GENERATING AN INTENSE MAGNETIC FIELD AND METHOD FOR MANUFACTURING SAID COIL

This is a non-provisional application claiming the benefit of International Application Number PCT/EP2011/056194 filed Apr. 19, 2011.

FIELD OF THE INVENTION

The present invention relates to a coil capable of generating a magnetic field adapted in particular for generating intense magnetic fields and/or for performance under large mechanical stresses, and a method for manufacturing said coil.

PRIOR ART

In the field of magnetic field production, it is well known to generate an intense magnetic field by “magnets” constituted by one or more coils through which an intense electric current passes, said coils being cooled.

Said coils are generally constituted by cylindrical tubes made of conductive or superconducting material and cut out along an overall helicoidal cut-out line, at constant pitch or not, to form turns.

These coils for intense fields are currently almost exclusively used in intense magnetic field laboratories and could be of use for example in NMR machines, as per the acronym “Nuclear Magnetic Resonance” for the imaging via magnetic resonance.

These NMR machines usually have a structure of the tunnel type with a central space reserved for the patient and an annular structure which integrates both means for creating in the central observation space a homogeneous and intense main magnetic field, and radiofrequency excitation means and radiofrequency processing means for signals reemitted by the body of the patient placed in the central observation space, in response to the excitation sequences. To differentiate the radiofrequency signals sent in response and create an image, these machines also comprise coils known as gradient coils to superpose on the intense homogeneous field additional magnetic fields, the value of which depends on the spatial coordinates of their place of application.

Such an NMR machine is described for example in French patent application FR 2 892 524.

Documents U.S. Pat. No. 2,592,802, EP 0 146 494 and U.S. Pat. No. 3,466,743 which describe induction coils are also known.

Document U.S. Pat. No. 2,592,802 describes an induction coil comprising a tube made from conductive material and cut out along several overall helicoidal cut-out lines to form turns which are separated by a vertical portion ensuring separation between the turns. Said separation portion is cut out to form a pair of spacing members on either side of a cylindrical hole in which is advantageously inserted a rod made of insulating material, this rod acting as a spacer to avoid any contact between the turns.

Document EP 0 146 494 describes an induction coil comprising incomplete annular cut-outs made in a cylindrical tube, said incomplete annular cut-outs being connected by two vertical cut-outs. This type of induction coil is intended to displace spacers in nuclear reactors and is not intended to receive high-intensity currents to form intense fields.

Document U.S. Pat. No. 3,466,743 describes a coil comprising a tube made of conductive material and cut out along an overall helicoidal cut-out line to form turns, said turns passing through holes initially made along the tube, the cut-out line and/or the holes being filled with insulating material to prevent any deformation when very high-intensity currents pass through the coil, but also to maintain separation between the turns. In particular, when an insulating spacer is positioned at the level of a hole, the spacer has larger dimensions than the hole so that it can completely fill this hole and spread the adjacent turns.

None of the coils described in these documents is intended to form magnetic fields known as intense fields (that is, greater than 1 T), or to be placed in an intense magnetic field, and its structure is not adapted for such applications.

In particular, the gradient coils of magnetic fields or generating an intense magnetic field are subjected to intense electromagnetic forces which cause mechanical stresses resulting in deformation of the turns of the coil. The deformation of the turns can cause a lack of reliability of the machine and/or inhomogeneity of the magnetic field harmful to conducting good-quality imaging. For this reason the application WO 2009/053420 published on Apr. 30 2009 proposes using coils comprising a tube made of conducting material and cut out along an overall helicoidal line to form a plurality of turns, in which at least one turn comprises at least one boss extending to the right of an indentation of corresponding form formed in an adjacent turn. Such a configuration is advantageous in that it absorbs the mechanical stresses caused by the electromagnetic forces and the mechanical forces of thermal origin.

However, for numerous applications such as superconducting magnets it is necessary that the coil structure can be cooled permanently, especially by circulation of cooling fluid, preferably cryogenic fluid (based on nitrogen, helium or hydrogen for example). This cooling must also be as homogeneous as possible in the structure. Such cooling is particularly useful for compensating the thermal increase undergone by the structure in case of transit or resistive transition (<<quench>>).

One of the aims of the invention is therefore to rectify all these disadvantages by proposing a coil or a set of coils adapted to generate an intense magnetic field, especially to form superconducting magnets, and a method for manufacturing said coil of simple and low-cost design.

More precisely an aim of the present invention is to provide a coil or a set of coils adapted to be regulated thermally and be easy to manufacture, and preferably absorbing the mechanical stresses exerted on the turns of the coils by electromagnetic forces and/or mechanical forces of thermal origin.

EXPLANATION OF THE INVENTION

To this end and in keeping with the invention, a method is proposed for manufacturing a coil capable of generating a magnetic field known as intense field when an electric current passes through it, comprising a step of formation of turns in a tube made of conducting and/or superconducting material, characterised in that it comprises at least one step of formation of at least one indentation in an edge of at least one turn of said coil, said indentation forming a channel between the interior and the exterior of the tube.

More precisely, when insulating material is positioned between the turn comprising the indentation and an adjacent turn, said indentation is made in the edge such that it forms with the insulating material a passage between the interior and the exterior of the tube when the coil is stressed.

Preferred but non-limiting aspects of this method, taken alone or in combination, are the following:

- the step of formation of at least one indentation comprises the formation of at least one first indentation in an edge of at least one turn of said coil and of at least one second indentation in an edge of an adjacent turn such that the first indentation faces the second indentation, the first and second indentations made in the adjacent turns forming the passage between the interior and the exterior of the tube.

the method further comprises the formation of at least one boss on the turn comprising the first indentation and the formation of at least one recess on the turn comprising the second indentation such that the boss extends to the right of said recess, absorbing the mechanical stresses caused by the electromagnetic forces and the mechanical forces of thermal origin.

the first indentation is formed in the edge of the turn at the level of the profile in the form of a boss and the second indentation is formed in the edge of the turn at the level of the profile in the form of a recess.

the formations of the boss and of the first indentation are done concomitantly, and in that the formations of the recess and of the second indentation are done concomitantly.

the method comprises a previous step of optimisation of the boss or bosses and of the corresponding recesses or recesses, and the indentations.

the optimisation step consists at least of the following steps of:

determination of a meshing of the turns and the boss or bosses and the corresponding recess or recesses, simulation of the temperature rises and/or the electromagnetic fields from the meshing, comparison of the temperature rises and/or of the electromagnetic fields with those of a reference meshing having no bosses and/or having no recesses, comparison of the displacements under the electromagnetic and thermal loads of the turns with those of a reference model having no bosses and/or having no recesses.

the turns, the bosses and the corresponding recesses, and the indentations are formed by cut-out of a cylindrical tube along a line of overall helicoidal cut-out.

insulating material is deposited in the cut-out line between two adjacent turns, this insulating material able to be in the form of insulating plates comprising a plurality of fine superposed insulating sheets.

According to another aspect of the invention a coil is proposed, capable of generating a magnetic field known as intense field when an electric current passes through it, said coil comprising at least one tube or a set of tubes made of conducting and/or superconducting material and cut out along a cut-out line to form turns, characterised in that at least one turn comprises at least one indentation formed in an edge of said turn, said indentation forming a channel between the interior and the exterior of the tube.

The coil preferably comprises insulating material at least partially covering the cut-out line, the indentation being formed in an edge of a turn opposite said insulating material, said indentation forming with the insulating material a channel between the interior and the exterior of the tube when the coil is stressed.

Preferred but non-limiting aspects of this coil, taken alone or in combination, are the following:

at least one turn comprises at least one first indentation formed in an edge of said turn and facing a second indentation formed in an edge of an adjacent turn, the first and second indentations made in the adjacent turns forming the channel between the interior and the exterior of the tube.

the turn comprising the first indentation further comprises at least one boss extending to the right of a recess of corresponding form formed in the adjacent turn comprising the second indentation, the first and second indentations being formed in the edge of the corresponding turns at the level of the profile in the form of a boss and recess respectively.

the adjacent bosses of a turn are offset angularly.

the coil comprises a plurality of bosses and recesses whereof the concavity is oriented in the same direction.

the coil comprises a plurality of bosses and recesses and in that the concavity of at least one boss has an orientation opposite the orientation of the concavity of at least one second boss.

each indentation has a general semicircular or triangular or square or rectangular or trapezoidal form.

the turns comprise several indentations, the adjacent indentations of a turn being offset angularly.

the coil comprises insulating material at least partially covering the cut-out line, at least one indentation being made in an edge of a turn opposite said insulating material.

the insulating material comprises an insulating plate having a plurality of superposed fine insulating sheets.

the coil is made of solid superconducting material.

the coil also comprises a ribbon or wire formed in superconducting material, said ribbon or wire being fixed on the internal and/or external face of the tube.

The coil according to the invention will advantageously be used to form a magnet for an intense or homogeneous field, such as for example a superconducting magnet.

Such a coil could also be used as a solenoid gradient coil of a nuclear magnetic resonance machine.

DESCRIPTION OF THE FIGURES

Other advantages and characteristics will emerge from the following description of several variant embodiments, given by way of non-limiting examples, a coil capable of generating a magnetic field and particularly capable of generating an intense magnetic field and a method for manufacturing the coil according to the invention, from the attached drawings, in which.

DETAILED DESCRIPTION OF THE INVENTION

Figure 1:
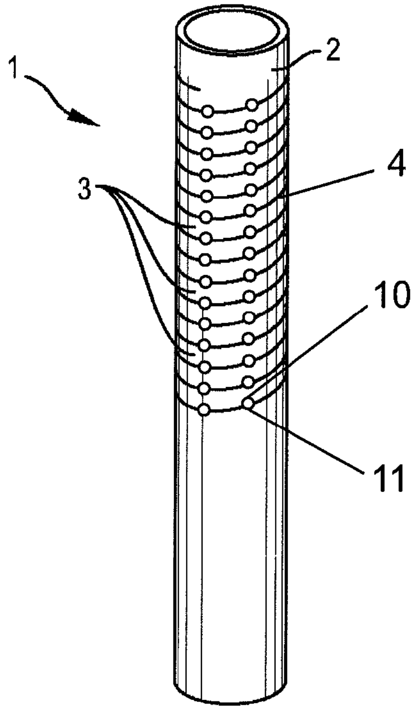
FIG. 1 is a perspective view of a coil according to a first embodiment of the invention.

In reference to FIG. 1, the coil 1 comprises a preferably overall hollow cylindrical tube 2 in which turns 3 have been formed using any appropriate cutting means along a preferably helicoidal cut-out line 4, said tube 2 being made of electrically conductive material such as metals or preferably a bulk superconducting (such as alloys of Bismuth or compounds of Yttrium or MgB2 for example), and said coil optionally comprising insulating material covering the cut-out line 4 in a way known to the person skilled in the art.

The tube 2 provided with turns 3 can constitute the coil 1 as such. However, according to another embodiment, the tube with the turns constitutes a support for a winding, this "support+winding" assembly forming said coil. In the case of a superconducting magnet, the winding can for example be formed by a superconducting band or wire (for example comprising an alloy of type NbTi, Nb3Sn, Nb3Al, or YBaCuO) surrounding the tube cut out in a spiral. Therefore the tube serves as mechanical support for the band or wire and is also used in thermal regulation of the superconducting magnet. In another variant, the superconducting band or wire is fixed supported on the internal face of the tube cut out in a helix. Further, the coil can be made of a plurality of tubes 2.

According to the invention, at least one indentation 10 is made in the edge of at least one of the turns 3, such an indentation being provided to form an opening, that is, a passage or channel, between the interior and the exterior of the tube 2. The indentation 10 on its own forms the opening, that is, the passage or channel, between the interior and the exterior of the tube 2, when the coil is stressed but also when not stressed.

In this respect, the indentation 10 corresponds to removal of material in the tube 2. In particular, the indentation 10 has no corresponding form made in the edge of the adjacent turn to the turn comprising said indentation. This removal of material constituting the indentation 10 therefore creates an opening through the coil irrespective of the position of the turns relative to one another, that is, whether they are stressed or not relative to one another, or whether an element (such as insulating material) is interposed or not between the adjacent turns.

The passage now formed between the interior and the exterior of the tube circulates cooling fluid through the coil, such as for example water or cryogenic fluid (e.g. fluid based on nitrogen, helium or hydrogen). This therefore enables permanent cooling of the structure, whether the tube serves as support to coiling to form the coil or whether it constitutes the coil as such.

Such a possibility for cooling is particularly advantageous to ensure thermal transfers necessary for compensating any thermal increase undergone by a superconducting coil in case of transit or transition from the superconducting state to the resistive state (<<quench>>).

The fact of being ale to thermally regulate the coil by passing cooling fluid between the interior and the exterior of the tube is also particularly advantageous for reducing mechanical deformations which can be of thermal origin.

As is preferred, the indentation or the indentations are made in the zone of the edges of the turns located opposite the insulating material. In fact, when insulating material is placed in the cut-out line 4, covering all or part of this cut-out line 4, this insulating material forms a barrier preventing circulation of the heating fluid between two adjacent turns, and results in local heating present in the normal functioning of resistive magnets and in the case of <<quench>> for a superconductor. When at least one of the turns 3 opposite the insulating material has a indentation 10 at the level of its edge, such an indentation forms an opening which will allow the preferred thermal transfer. With the insulating material the indentation 10 therefore forms a passage between the interior and the exterior of the tube 2 when the coil is stressed. The formation of an indentation opposite the insulating material therefore thermally regulates the coil at the level of said insulating material via the passage of cooling fluid, so as to avoid any local heating.

The indentations made in the edges of each of the turns can be any form, for example semicircular, triangular, square, rectangular, trapezoidal, or any other form which would create passage for cooling fluid. It should be noted that the form and size of the indentation will be optimised to allow passage of cooling fluid and control its flow rate while ensuring the physical properties (especially mechanical and electrical) of the turns (for example given the minimal width of the turns).

According to a preferred embodiment of the invention, a plurality of turns 3 of the coil 1 comprises an indentation 10 facing a complementary indentation 11 formed in an adjacent turn 3, such that the cooperation of these indentations (10, 11) forms the opening between the interior and the exterior of the tube 2 for the passage of cooling fluid. By complementary indentation is meant an indentation having a similar form, that is, an indentation with removal of similar material.

In the event where the insulating material is between the two adjacent turns presenting the indentation 10 and the complementary indentation 11, when the coil is stressed the opening between the interior and the exterior of the tube 2 comprises two passages formed by the insulating material and respectively the indentation 10 and the complementary indentation 11.

Such an embodiment is particular preferred when the width of the turns must remain small, which distributes the size of the opening over two adjacent turns, and therefore avoids embrittling the turns too much at the level of the indentations. In this case, the indentations made in several adjacent turns can advantageously present an angular offset.

In the particular embodiment presented in FIG. 1, the width of each turn 3 is constant; however, the width of all or part of the turns could be variable, the width of the space separating two adjacent turns being preferably constant, including at the level of the indentations.

As pointed out earlier, the turns 3 are preferably formed in an overall cylindrical tube 2 by cutting out along a helicoidal cut-out line 4. The helicoidal cut-out 4 is made as per parametrical equations in an orthonormal Cartesian system or the axis Oz is combined with the axis of revolution of the tube 2:

$x=R\cos t$, $y=R\sin t$, $z=kt$ where k designates a strictly positive given constant. R and t correspond to the cylindrical coordinates in a plane OXOY.

Figure 2:
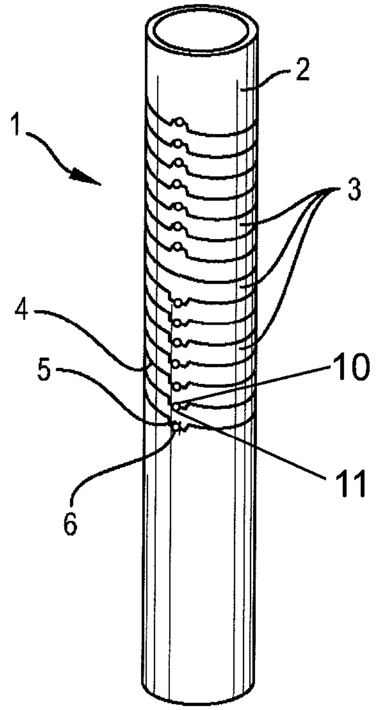
FIG. 2 is a perspective view of a coil according to a second embodiment of the invention.

According to a preferred embodiment of the invention such as illustrated in FIG. 2, a plurality of turns 3 of the coil 1 comprises a boss 5 extending to the right of a recess 6 of corresponding form formed in an adjacent turn 3 for absorbing the mechanical stresses caused by the electromagnetic couples on the turns 3 when a high-intensity current passes through them. As before, an indentation 10 is also provided in the edge of the turn 3 at the level of the profile in the form of a boss 5, and optionally but preferably, a complementary indentation 11 in the edge of the turn 3 at the level of the profile in the form of a recess 6. Each indentation is formed in the profile in the form of a boss of a turn so as to face the complementary indentation made in the profile in the form of a recess of the adjacent turn. In this way, when the boss 5 extends to the right of the corresponding recess 6, the indentations (10, 11) cooperate to form a passage or channel between the interior and the exterior of the tube, the latter being able to be used for passage of the cooling fluid.

Such an arrangement of bosses and recesses associated with the indentations in each one of the turns is highly advantageous to compensate the mechanical deformations of thermal origin on the one hand, and those due to electromagnetic forces. This combined effect is added to the initial effect of the indentations in terms of thermal regulation.

In addition, the fact of placing the indentations at the level of the bosses and recesses is particularly advantageous since this machines said indentations concomitantly with the corresponding bosses and recesses (for example by a method of cut-out by electroerosion wire), and therefore does not complicate the machining process of the coil, at the same time greatly improving the thermal properties of said coil.

In this particular embodiment all the bosses 5 and the recesses 6 of the turns 3 are overall aligned along a longitudinal straight line.

Yet, it is apparent that the bosses 5 of two adjacent turns could be angularly offset.

The upper part of the coil 1, arbitrarily illustrated vertically in FIG. 2, comprises a plurality of bosses 5 and recesses 6 whereof the concavity is oriented in the same direction, towards the lower end of said coil 1.

In addition, the lower part of the coil 1 also comprises a plurality of bosses 5 and recesses 6 whereof the concavity is oriented in the same direction, for example towards the upper end of said coil 1, opposite the direction to orientation of the concavity of the bosses 5 of the turns 3 of the upper part of said coil.

It is understood that the coil 1 could comprise only a single boss and a single recess or a plurality of bosses and recesses on one or more turns, the concavity of at least one boss oriented opposite the orientation of the concavity of at least one second boss.

In this embodiment, each boss 5, and consequently each recess 6, has general semicircular form, but it is apparent that each boss 5 could have any form such as a triangular, square or rectangular form, for example.

The helicoidal cut-out 4 is obtained as per the parametric equations in an orthonormal system where the axis Oz coincides with the axis of revolution of the tube 2:

$x=R\cos f(t)$, $y=R\sin f(t)$, $z=k\,g(t)$ where R and k are strictly positive given constants.

It is evident that f(t) could be substituted by f(t,θ) to adjust the angle of cut-out along Oz in a radial plane. The bosses 5 and the recesses 6 would then have an overall conical form, that is, their edges would not be perpendicular to the axis of revolution of the tube 2.

The function g(t) is preferably a trigonometric function of form, for example: $x=R\cos(t)$, $y=R\sin(t)$ $$z=t/(2*\pi)*(1+a*\cos(4t))$$

Thus, the helicoidal cut-out 4 forms bosses 5 and recesses 6 in the turns 3 relative to a helicoidal cut-out of reference obtained according to the parametric equations:

$x=R\cos t$, $y=R\sin t$, $z=kt$ where k is a strictly positive given constant.

Here in the text, boss means a projecting part of a turn 3 relative to a turn made by a helicoidal cut-out reference line.

Figure 3:
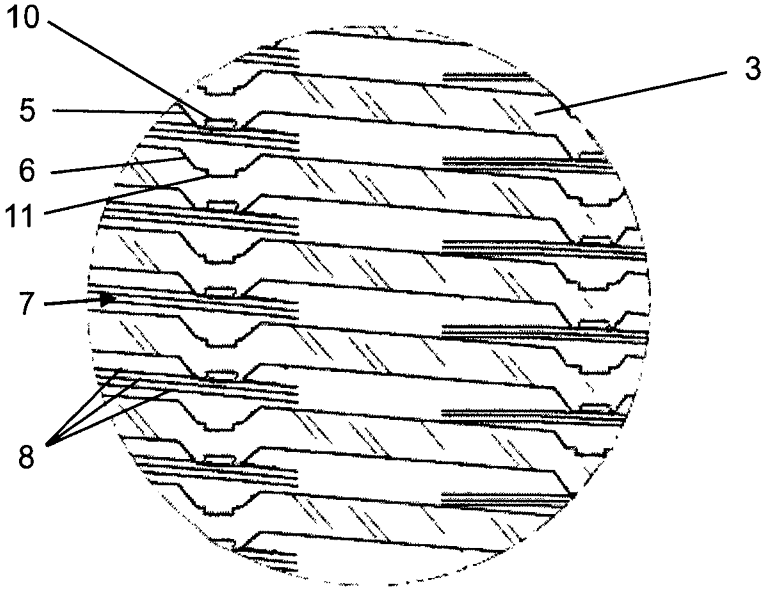
FIG. 3 is a perspective view of a detail of a coil according to a third embodiment of the invention, before compression of the insulating plates.
Figure 4:
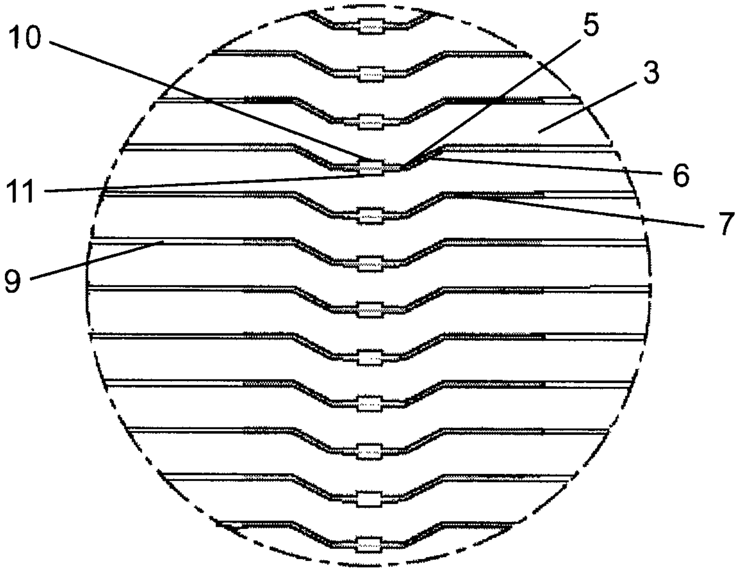
FIG. 4 is a perspective view of a detail of the coil according to the third embodiment of the invention following compression of the insulating plates.

According to another variant embodiment of the coil of the invention, in reference to FIGS. 3 and 4, the latter comprises, as before, an overall cylindrical tube 2 in which turns 3 have been formed by cutting out along an overall helicoidal cut-out line 4, said turns comprising bosses 5 and recesses 6 of corresponding forms, an indentation also being formed at the level of each boss and recess of the turns. In the embodiment presented, said bosses 5 and said recesses 6 have a trapezoidal form, while the indentations have a rectangular form.

The cross-section of the bosses 5 and recesses 6 can decrease from the outer wall towards the inner wall of the tube 3.

This form of bosses and of recesses is particularly adapted for employing thin turns and/or for insulating wedging.

Also, it is apparent that this technique can be applied to the design of coils of non-uniform current density.

In addition, in reference to FIG. 3, insulating plates such as pre-impregnated fibreglass plates known as "pre-preg", according to the English acronym "pre-impregnated" or insulating sheets of polyimide type, can be positioned between two adjacent turns 3, said plates preferably having a form of annular section. To enable introduction of these insulating plates 7, the turns 3 are spread by any appropriate means (FIG. 3). These insulating plates 7 advantageously comprise several fine superposed sheets 8, at least three thin superposed insulating sheets 8. In this way, once the insulation is compressed, in reference to FIG. 4, it conforms to the outline of the turn 3 without breaking. In fact, such superposition of thin insulating sheets 8 causes a decrease of the internal stress of the insulator. In addition, the intermediate sheet 8 is never in direct contact with the metal or the superconducting material of the turns 3, ensuring increased electrical safety It is apparent that the insulating plates 7 could comprise any number of sheets 8 and that they could be made of any insulating material without as such departing from the scope of the invention.

The positioning of the indentation or the indentations (10, 11) made at the level of the bosses 5 and recesses 6 in the zone comprising the insulating plates 8 is particularly advantageous since the opening made by these indentations guarantees thermal transfer in this zone, which in the opposite would form case a hot point in the coil, which is to be avoided to be able to have homogeneous thermal regulation.

It is further to be noticed that wedging of insulating plates between successive bosses 5 and recesses 6 enables passage of cooling liquid between two zones comprising a boss 5 and a recess 6 (FIG. 4). In fact, the insulating plates spread the turns 3 formed in the tube 2, creating openings 9 between two zones comprising a boss 5 and a recess 6, these openings 9 also allowing circulation of cooling fluid between the interior and the exterior of the tube and vice versa. Said cooling liquid comprises for example water in the case of resistive magnets, or helium or liquid nitrogen in the case of superconducting materials. Such an arrangement therefore has increased thermal regulation, since it is effected not only by the openings 9 made between the recesses 6 and bosses 5, but also at the level of the passages formed by the indentations (10, 11).

Figure 5:
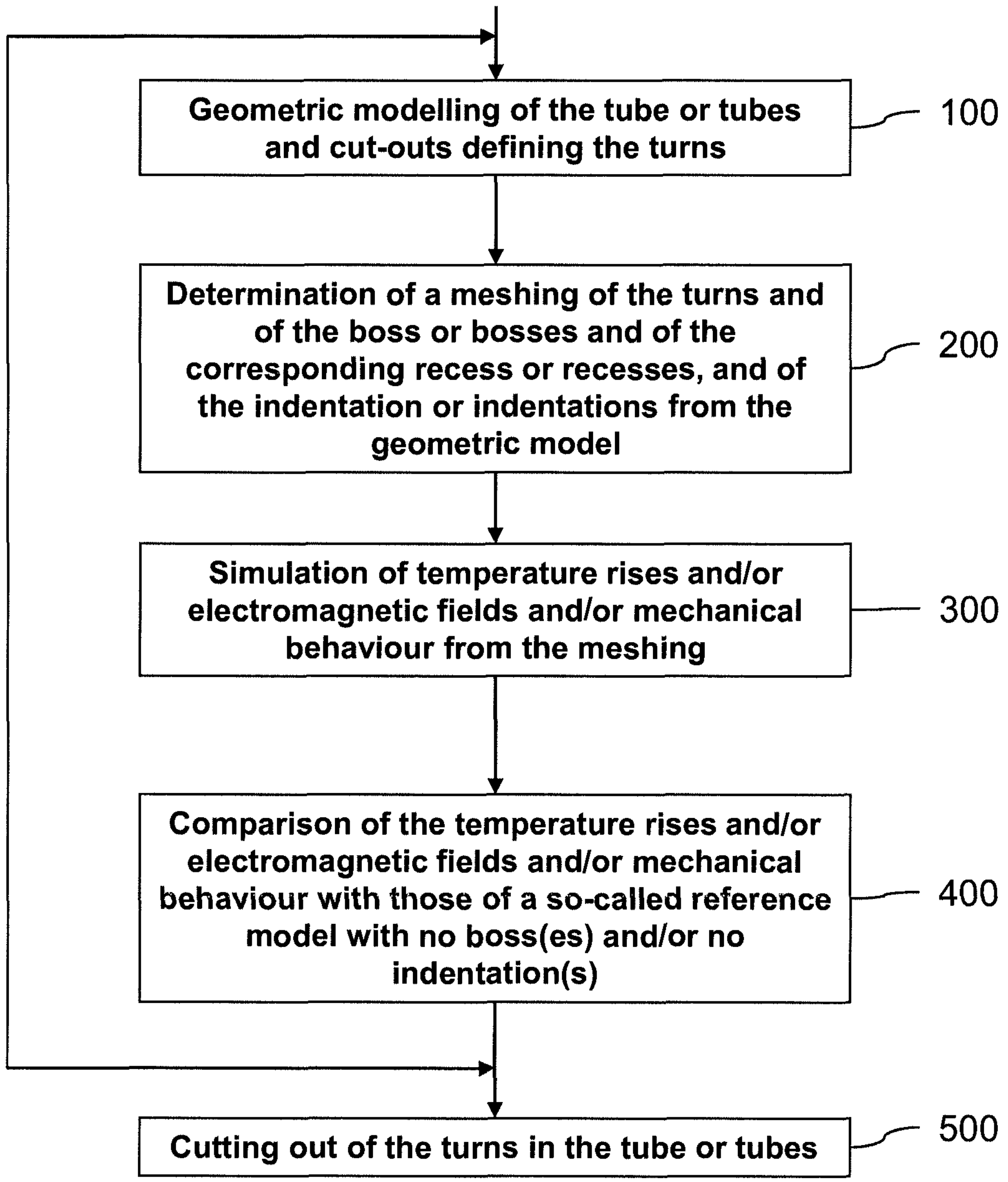
FIG. 5 is a diagram illustrating the steps for making a coil according to the invention.

The method for manufacturing a coil according to the invention will now be explained, in reference to FIG. 5.

In an initial step 100, a geometric model of the turns is made using computer-aided design software (CAD) such as CATIA® or Open Cascade marketed by the company Open Cascade SAS. Meshing of the turns 3 and of the boss or bosses 5 and of the corresponding recess or recesses 6 and the indentations (10, 11) is carried out in a step 200 by the CAD model using adapted software such as for example CATIA® software or a Ghs3d® mesher by the company Distene, then in a step 300, simulation of temperature rises and/or electromagnetic fields and/or of the mechanical behaviour corresponding to previous meshing is carried out.

Said temperature rises and/or electromagnetic fields and/or mechanical deformations produced by this meshing are compared, in a step 400, to a reference model having neither bosses nor recesses. If needed, modifications can be made to the geometry of the turns. The procedure is then repeated to obtain an adapted model.

The same procedure can be utilised for optimisation of mechanical stresses.

Steps 100 to 400 are reiterated to obtain a meshing having a minimal temperature rise and/or a homogeneous or quasi-homogeneous magnetic field and/or a minimisation of displacements due to electromagnetic and thermal loads.

The parameterised curve corresponding to the retained cut-out determined in this way is then transmitted to a digital cutting machine which proceeds with cutting out the turns 3, bosses 5 and recesses 6 and indentations (10, 11) in the tube 2, in a step 500. When the indentations (10, 11) are positioned at the level of the bosses 5 and recesses 6, their cut-out can be done at the same time as the cut-outs of the corresponding bosses 5 and recesses 6 which is highly advantageous in terms of machining.

It is apparent that prior to the meshing step 100 a step for determining the number of turns, the width of the turns and the dimensions of the tube including its length, its thickness and its external diameter is conducted in keeping with the idea of the publication "Magnet Calculations at the Grenoble High Magnetic Field Laboratory", Christophe Trophime, Konstantin Egorov, François Debray, Walter Joss and Guy Aubert, IEEE TRANSACTIONS ON APPLIED SUPERCONDUCTIVITY. VOL. 12, NO 1, March 2002.

In addition, it is apparent that the bosses 5 and the recesses 6 cooperate to ensure centring of the turns.

It is understood that the tube 2 could comprise a set of tubes, said tube 2 or the set of tubes being made of conductive material and/or bulk superconducting material. Alternatively, the tube 2 could constitute a supporting tube made of copper or stainless steel for example, and to which superconducting wire or cables are connected, such as by soldering. The supporting tube fitted with bosses 5 and recesses 6 according to the invention then enables absorbing electromagnetic forces and as thermal dissipation in the event of "quench", that is the accidental or not return to normal state of the superconducting part.

Finally, it is apparent that the coils described hereinabove could have numerous applications in the fields of magnetic field generation for experimental purposes, or nuclear magnetic resonance imaging for example, and that the above examples are only particular illustrations are in no way limiting as to fields of application of the invention.

The invention claimed is:

1. A method for manufacturing a coil for generating a magnetic field known as intense field when an electric current passes through said coil, comprising:

forming turns in a tube made of conducting and/or superconducting material along a cut-out line, forming at least one first indentation in an edge of at least one said turns, forming at least one second indentation in an edge of an adjacent turn such that the first indentation faces the second indentation positioning insulating material between the adjacent turns comprising the at least one first indentation and at least second one indentation respectively, wherein said indentations form with the insulating material a channel between the interior and the exterior of the tube when the coil is stressed forming at least one boss on the turn comprising the first indentation, forming at least one recess on the turn comprising the second indentation, wherein the boss extends to the right of said recess, said boss for absorbing the mechanical stresses caused by the electromagnetic forces and the mechanical forces of thermal origin.

2. The method of claim 1, wherein the first indentation is formed in the edge of the turn at the level of the profile in the form of a boss and the second indentation is formed in the edge of the turn at the level of the profile in the form of a recess.

3. The method of claim 1, wherein the formations of the boss and of the first recess are done concomitantly, and in that the formations of the recess and of the second indentation are done concomitantly.

4. The method of claim 1, wherein it comprises a previous optimisation step of the boss or bosses and of the corresponding recess or recesses, and of the indentations.

5. The method of claim 4, wherein the optimisation step consists at least of the following steps of:

determination of a meshing of the turns and the boss or bosses and the corresponding recess or recesses, simulation of the temperature rises and/or the electromagnetic fields from the meshing, comparison of the temperature rises and/or of the electromagnetic fields with those of a reference meshing having no bosses and/or having no recesses, comparison of the displacements under the electromagnetic and thermal loads of the turns with those of a so-called reference model having no bosses and/or having no recesses.

6. A method of claim 1, wherein the turns, the bosses and corresponding recesses, and the indentations are formed by a cut-out of a cylindrical tube along an overall helicoidal cut-out line.

7. The method of claim 1, wherein the insulating material is deposited in the cut-out line between two adjacent turns in the form of insulating plates comprising a plurality of superposed fine insulating sheets.

8. A coil capable of generating a magnetic field known as intense field when an electric current passes through said coil, said coil comprising at least one tube made of conducting and/or superconducting material and cut out along a cut-out line to form turns, wherein it comprises at least one first indentation formed in an edge of at least one said turns, at least one second indentation formed in an edge of an adjacent turn such that the first indentation faces the second indentation, insulating material at least partially covering the cut-out line and positioned between the adjacent turns comprising the at least one first indentation and at least second one indentation respectively, wherein said indentations with the insulating material a channel between the interior and the exterior of the tube when the coil is stressed at least one boss formed on the turn comprising the first indentation, at least one recess formed on the turn comprising the second indentation, wherein the boss extends to the right of said recess, said boss for absorbing the mechanical stresses caused by the electromagnetic forces and the mechanical forces of thermal origin.

9. The coil of claim 8, wherein the adjacent bosses of a turn are offset angularly.

10. The coil of claim 8, wherein it comprises a plurality of bosses and recesses whereof the concavity is oriented in the same direction.

11. The coil of claim 8, wherein it comprises a plurality of bosses and recesses and in that the concavity of at least one boss presents an orientation opposite the orientation of the concavity of at least one second boss.

12. The coil of claim 8, wherein each indentation presents a general semicircular or triangular or square or rectangular or trapezoidal form.

13. The coil of claim 8, wherein the turns comprise several indentations, the adjacent indentations of a turn being offset angularly.

14. The coil of claim 8, wherein the insulating material comprises an insulating plate having a plurality of superposed fine insulating sheets.

15. The coil of claim 8, wherein it is made of solid superconducting material.

16. The coil of claim 8, wherein it further comprises a ribbon or wire formed of superconducting material, said ribbon or wire being fixed on the internal and/or external face of the tube.

17. Application of the coil of claim 8 to a superconducting magnet.

18. Application of the coil of claim 8 to a solenoid gradient coil of a nuclear magnetic resonance machine.

* * * * *

UNITED STATES PATENT AND TRADEMARK OFFICE

CERTIFICATE OF CORRECTION

PATENT NO. : 9,275,780 B2
APPLICATION NO. : 13/641685
DATED : March 1, 2016
INVENTOR(S) : Francois Debray et al.

It is certified that error appears in the above-identified patent and that said Letters Patent is hereby corrected as shown below:

In the Claims,

Column 10, Claim 8, line 38, please delete “indentations with” and insert --indentations form with--

Signed and Sealed this
Twenty-third Day of August, 2016

Michelle K. Lee
*Director of the United States Patent and Trademark Office*